Oct. 15, 1957   E. G. FORSSELL   2,809,757
SHOCK ABSORBING MECHANISMS
Filed Oct. 21, 1953   2 Sheets-Sheet 1
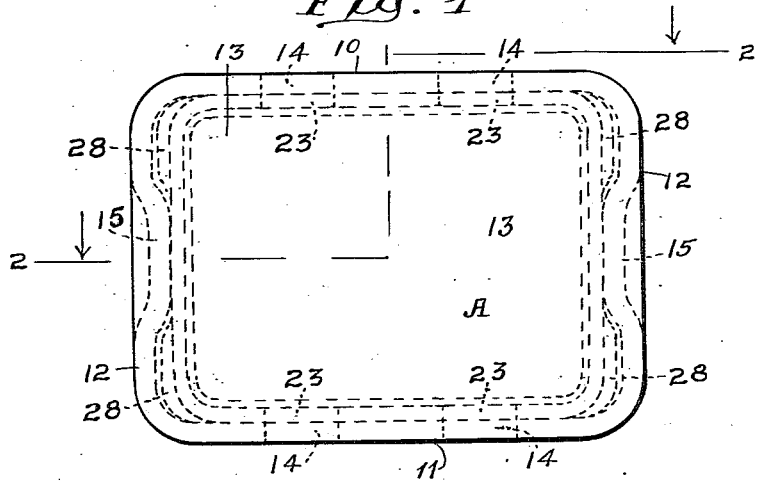
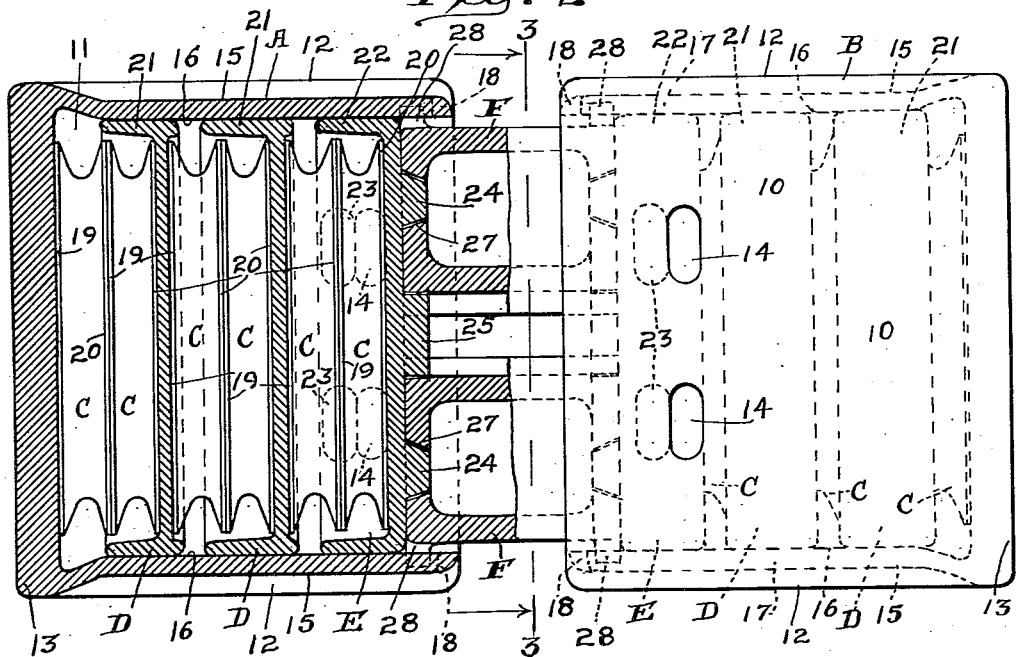
Inventor:
Eric G. Forssell.
By Henry Fuchs
Atty.

Oct. 15, 1957   E. G. FORSSELL   2,809,757
SHOCK ABSORBING MECHANISMS
Filed Oct. 21, 1953   2 Sheets-Sheet 2
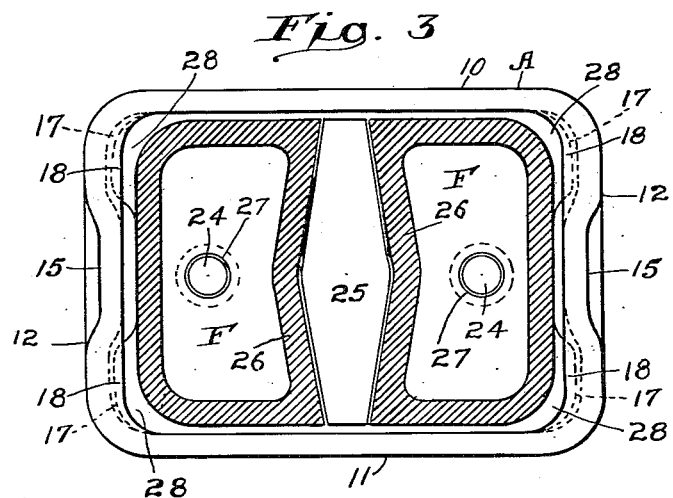
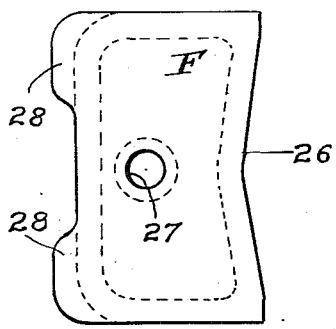
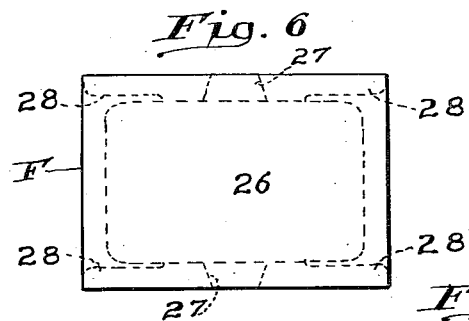
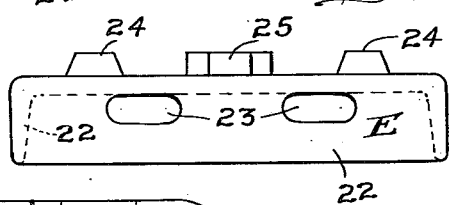
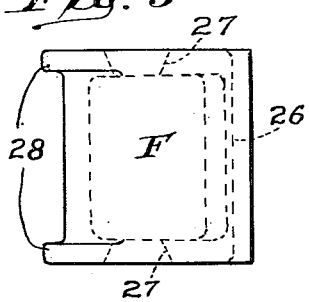
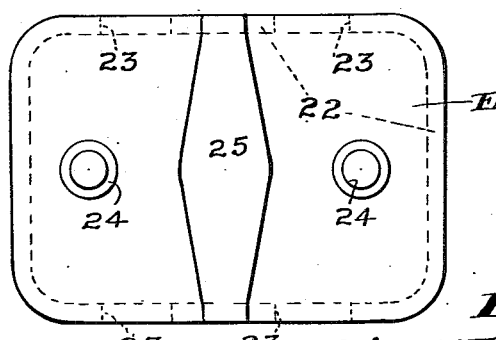
Inventor
Eric G. Forssell.
By Henry Fuchs
Atty.

United States Patent Office 2,809,757
Patented Oct. 15, 1957

2,809,757

SHOCK ABSORBING MECHANISMS

Eric G. Forssell, Kenmore, N. Y., assignor to W. H. Miner, Inc., Chicago, Ill., a corporation of Delaware Application October 21, 1953, Serial No. 387,454

2 Claims. (Cl. 213—45)

This invention relates to improvements in shock absorbing mechanisms for draft riggings of railway cars.

One object of the invention is to provide a shock absorbing mechanism comprising front and rear casings, relatively movable toward and away from each other, and front and rear cushioning elements within said casings compressed by movement of said casings toward each other, wherein the casings are connected by locking elements which have shouldered engagement with the casings and are held engaged by spreading means interposed between the same, and wherein the spreading means is held in said interposed position by the cushioning elements.

A further object of the invention is to provide a shock absorbing mechanism including front and rear casings, relatively movable toward and away from each other, connected by locking elements which are spread apart to hold the same engaged with the casings, front and rear cushioning means within said casings, and followers associated with said cushioning means, respectively, and having projecting portions thereon engaged between said locking elements to hold the latter spread apart.

Other objects of the invention will more clearly appear from the description and claims hereinafter following.

In the accompanying drawings forming a part of this specification,

Figure 1 is a front elevational view of my improved mechanism.

Figure 2 is a part horizontal, longitudinal sectional view and part plan view of my improved mechanism, the sectional view corresponding substantially to the line 2—2 of Figure 1, certain rubber shock absorbing units of the mechanism being shown in elevation.

Figure 3 is a transverse sectional view, corresponding substantially to the line 3—3 of Figure 2.

Figure 4 is an end elevational view of one of the locking blocks of my improved mechanism.

Figure 5 is a side elevational view, looking upwardly in Figure 4.

Figure 6 is a back elevational view, looking from right to left in Figure 4.

Figure 7 is an elevational view of one of the follower plates of my improved mechanism, the same being the follower plate shown at the left hand side of Figure 2.

Figure 8 is a top plan view of Figure 7.

As illustrated in said drawings, my improved shock absorbing mechanism comprises broadly front and rear casings A and B, a plurality of rubber cushioning units C—C, a plurality of spacing follower plates or separators D—D—D—D, a pair of follower plates E—E, and a pair of connecting elements F—F for the casings A and B.

The front and rear casings A and B are of rectangular, boxlike formation, open at their inner or opposed ends. Each casing has longitudinally extending, horizontal, vertically spaced, top and bottom walls 10 and 11, longitudinally extending, laterally spaced side walls 12—12, and a transverse outer end wall 13, the end wall 13 of the casing A being at the front end thereof, and that of the casing B being at the rear end of the same. The walls 10 and 11 of each casing are provided with pairs of vertically aligned key receiving openings 14—14 and 14—14, adjacent the open inner end of the same, as shown in Figure 2. The central portions of the side walls 12—12 of each casing are indented for the greater portion of the length of said casing, as indicated at 15, thereby providing lengthwise extending, central guides 16—16, and longitudinally extending, internal guide channels 17—17 above and below each guide 16. The guide channels 17—17 of each casing are closed at the open end of the casing by inturned flanges 18—18, which form stops for a purpose hereinafter pointed out. At the closed end of each casing, the indented portions 15—15 of the side walls 12—12 thereof merge with the wall 13, which is truly rectangular.

The rubber units C—C are all of the same design, each comprising front and rear, rectangular, metal plates 19—19, and a rectangular rubber pad 20 interposed between and bonded to said plates. The peripheral edges of the rubber pads are preferably grooved or indented, as shown. The units C—C are arranged within the casings A and B in column or stack formation. The column of units C—C in each casing comprises three sets of two units each, the sets of units being separated by the spacing follower plates D—D.

The spacing follower plates D are all of rectangular shape and slidingly fit within the casings A and B, between the top and bottom walls 10 and 11 and the guides 16—16. Each of the spacing plates D is provided with a peripheral flange 21, which extends from one side thereof, the flanges of the plates in the casing A extending forwardly therefrom and overhanging the sets of units in front of the same, and those of the plates in the casing B extending rearwardly therefrom and overhanging the sets of plates to the rear of the same.

The follower plates E—E are disposed, respectively, at the rear and front ends of the columns of units in the front and rear casings. Each of the follower plates E is of rectangular shape and slidingly fits within the corresponding casing between the walls 10 and 11 and the guides 16—16. Each follower plate E has a peripheral flange 22, the flange of the follower plate E within the front casing A projecting forwardly therefrom and overhanging the adjacent set of units C—C, and the flange of the follower plate E within the rear casing B projecting rearwardly therefrom and overhanging the set of units C—C to the rear thereof. The flange 22 of each follower plate E is provided with a pair of key receiving openings 23—23 and 23—23 in the top and bottom sections of said flange. The openings 23—23 and 23—23 of each follower plate E will register with the key receiving openings 14—14 and 14—14 of the corresponding casing A or B when forced inwardly to a predetermined extent so as to receive the keys inserted through the openings 14—14 and 14—14 to lock the follower plate in fixed position with respect to the casing during the operation of applying the connecting elements F—F. Each of the follower plates E has a pair of laterally spaced, conical bosses 24—24, and a broadly, diamond shaped, central filler projection 25 presenting V-shaped side faces projecting from the side thereof which is opposite to the side from which the flange 22 projects, the bosses 24—24 and the filler projection 25 of the follower plate E at the rear end of the casing A extending rearwardly, and those of the follower plate E at the front of the casing B projecting forwardly therefrom.

The connecting elements F—F are disposed between the follower plates E—E and serve to connect the casings A and B. Each element F is in the form of a hollow block bearing at its front and rear ends on the follower plates E—E of the casings A and B, respectively. These elements F—F are located at opposite sides of the mechanism, in laterally spaced apart condition, the same being held separated by the filler projections 25—25 of the follower plates E—E, which filler projections are engaged between the elements F—F at the front and rear ends thereof. The inner sides of the connecting elements F—F are of V-shaped, transverse cross section, as indicated at 26—26, to interfit with the V-shaped sides of the projections 25—25. Each element F has conical seats 27—27 in the front and rear end walls thereof, within which the corresponding bosses 24—24 of the follower plates E—E of the front and rear casings A and B are seated. On each element F are pairs of laterally projecting lugs 28—28 and 28—28 at the front and rear ends thereof, which, in the spread apart condition of the elements F—F, extend into the channels 17—17 and 17—17 of the front and rear casings A and B, in back of the flanges 18—18 and 18—18 of said casings. As will be evident, the elements F—F thus serve to connect the casings A and B to each other to maintain the mechanism assembled and limit relative longitudinal separation of the casings.

In assembling the mechanism, the cushioning units C, spacing follower plates D, and the follower plates E are placed within the casings A and B while the latter are stood on end. After this has been done, the follower plate E of each casing is forced inwardly against the resistance of the cushioning units C until the key receiving openings 23 of the follower plate E register with the key receiving openings 14 of the casing. The follower plates E—E of both casings A and B are then locked in position by suitable keys, not shown, engaged in the openings 14 and 23. The casings A and B are then connected by engaging the same over the front and rear ends of the connecting elements F—F and spreading the latter apart to engage the lugs 28—28 and 28—28 thereof behind the stop flanges 18—18 and 18—18 of said casings. After the connecting elements F—F are in this position, the follower plates E—E are unlocked by removing the locking keys, thereby permitting the rubber cushioning units C—C to expand and force the follower plates E—E outwardly to the positions shown in Figure 2, with the filler projections 25—25 engaged between the connecting elements F—F and the bosses 24—24 engaged in the seats 27—27 of said elements.

The operation of my improved mechanism is as follows: In absorbing shocks, the rubber cushioning units C—C are compressed by movement of the casings A and B toward each other, thereby providing high cushioning effect. When the actuating pressure is reduced, the parts are returned to normal position by the expansive action of the rubber units C—C, separation of the casings A and B being limited by the lugs 28—28 of the connecting elements F—F coming into engagement with the shoulders formed by the flanges 18—18 of the casings A and B.

I claim:

1. In a shock absorbing mechanism, the combination with front and rear casings, relatively movable toward and away from each other lengthwise of the mechanism, said casings being open at their inner ends; of a pair of elongated connecting elements having lugs at their front and rear ends in shouldered engagement with said casings for limiting longitudinal separation of said casings; a follower plate bearing on the front ends of said connecting elements and having a spreading projection thereon engaged between said elements; a second follower plate bearing on the rear ends of said connecting elements and having a spreading projection thereon engaged between said elements; and cushioning means within each casing bearing on the corresponding follower plate.

2. In a shock absorbing mechanism, the combination with front and rear casings relatively movable toward and away from each other lengthwise of the mechanism, said front casing being open at its rear end and said rear casing being open at its front end; of a pair of elongated connecting elements having lugs at their front and rear ends in shouldered engagement with said front and rear casings, respectively, for limiting longitudinal separation of said casings, each of said elements having seats in the front and rear ends thereof; a follower plate bearing on the front ends of said connecting elements, said follower plate having a spreading projection thereon engaged between said elements, and centering bosses engaged in seats at the front ends of said elements; a second follower plate bearing on the rear ends of said connecting elements, said last named follower plate having a spreading projection thereon engaged between said connecting elements, and centering bosses engaged in said seats at the rear ends of said connecting elements; a cushioning means in said front casing bearing on said first named follower plate; and a second cushioning means within said rear casing bearing on said second named follower plate.

References Cited in the file of this patent

UNITED STATES PATENTS

| | | |
|---|---|---|
| 1,853,857 | Glascodine et al. | Apr. 12, 1932 |
| 2,527,589 | Spence | Oct. 31, 1950 |
| 2,647,744 | Dentler | Aug. 4, 1953 |